(12) United States Patent
Toda

(10) Patent No.: US 7,239,423 B2
(45) Date of Patent: Jul. 3, 2007

(54) IMAGE PROCESSING APPARATUS

(75) Inventor: Masayuki Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 10/322,612

(22) Filed: Dec. 19, 2002

(65) Prior Publication Data
US 2003/0123092 A1 Jul. 3, 2003

(30) Foreign Application Priority Data
Dec. 28, 2001 (JP) ............................. 2001-398661

(51) Int. Cl.
*H04N 1/32* (2006.01)
*H04N 1/41* (2006.01)
(52) U.S. Cl. .................................. 358/1.9; 358/426.12
(58) Field of Classification Search ...... 358/1.14–1.17, 358/1.9, 426.05–426.06, 426.12
See application file for complete search history.

(56) References Cited
U.S. PATENT DOCUMENTS 6,137,587 A * 10/2000 Muto et al. ................ 358/1.15
6,278,527 B1 * 8/2001 Maeda et al. .............. 358/1.15
6,906,822 B1 * 6/2005 Nohnishi ................... 358/1.16
2002/0094122 A1 7/2002 Matsukubo et al. ........ 382/165

FOREIGN PATENT DOCUMENTS

| JP | 09188041 A | * | 7/1997 |
| JP | 11-127353 A | | 5/1999 |
| JP | 2000-259819 A | | 9/2000 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

To print a satisfactory image output according to a kind of image without pressure of memory resources and a decrease of transfer speed due to an increase of image data capacity, a CPU of an image processing apparatus expands print data received from an external apparatus into image data, generates an attribute signal representing an attribute of the image data expanded based on the print data, stores the image data of which the data capacity has been reduced by decreasing the number of gradations and the generated attribute signal in a frame memory, and transmits the image data stored in the frame memory to an image forming apparatus according to the attribute of the image data in a state that the attribute signal has been added to the stored image data.

17 Claims, 11 Drawing Sheets

FIG. 11A

| CYAN | MAGENTA | YELLOW | BLACK | ATTRIBUTE |
|---|---|---|---|---|
| 7 BITS | 7 BITS | 7 BITS | 7 BITS | 1 BIT |

FIG. 11B

| CYAN | MAGENTA | YELLOW | BLACK | ATTRIBUTE |
|---|---|---|---|---|
| 8 BITS | 8 BITS | 8 BITS | 7 BITS | 1 BIT |

FIG. 11C

| CYAN | MAGENTA | YELLOW | BLACK |
|---|---|---|---|
| 8 BITS | 8 BITS | 8 BITS | 8 BITS |

FIG. 13

STORAGE MEDIUM SUCH AS FD, CD-ROM OR THE LIKE

| DIRECTORY INFORMATION |
|---|
| 1ST DATA PROC PROGRAM<br>PROGRAM CODE GROUP CORRESPONDING TO STEPS OF FLOW CHART SHOWN IN FIG. 12 |
|  |

MEMORY MAP OF STORAGE MEDIUM

IMAGE PROCESSING APPARATUS

BACKGROUND OF THE INVENTION

1. Field of the Invention

The present invention relates to a changeover of an image output mode particularly according to kinds of image data, in a print system that a print job received from a host computer connected on a network is processed by an image processing apparatus and then output to a recording medium by an image forming apparatus.

2. Related Background Art

Recently, an image processing system such as a color image printing system that print data generated on a host computer is printed by an image forming apparatus such as a color copying machine or the like through an image processing apparatus or the like develops.

In such a color image printing system, for example, as proposed by Japanese Patent Application Laid-Open Nos. 11-127353 and 2000-259819, there is conventionally a means which extracts the feature of each pixel of an image by using an image area separation means and uses the extracted feature of each pixel in an image process to improve a quality of the image to be print output.

Hereinafter, a conventional image processing system having an image area separation means will be explained with reference to FIG. 14.

FIG. 14 is a block diagram showing the structure of the conventional image processing system which is the basic type of the image processing apparatus used in Japanese Patent Application Laid-Open No. 11-127353 and the like.

As shown in FIG. 14, an input image (represented by Y (yellow), M (magenta), C (cyan) and K (black) signals) obtained from an external apparatus 3-01 is sent to a density/brightness conversion unit 3-02. Then, in the density/brightness conversion unit 3-02, the input image represented by the Y, M, C and K signals is converted into signals representing so-called additive three primary colors of R (red), G (green) and B (blue) by a not-shown an LUT (look-up table) ROM, and the converted R, G and B signals are then input to a brightness/density conversion unit 3-03 and an image area separation unit 3-07.

First, in the brightness/density conversion unit 3-03, the input R, G and B signals are converted into Y, M, C and K signals based on a so-called subtractive color mixing principle, and the obtained Y, M, C and K signals are then input to a smoothing circuit 3-04.

On the other hand, in the image area separation unit 3-07, the input R, G and B signals for each pixel are subjected to an edge detection process by an edge detection circuit 3-08 on the basis of information obtained from peripheral pixels, and an edge signal is resultingly output. Likewise, the input R, G and B signals for each pixel are subjected to a feature extraction process such as thickness discrimination or the like by a thickness discrimination circuit 3-09, and a zone signal is resultingly output. Then, on the basis of the extracted features represented by the edge and zone signals, it is discriminated by an LUT 3-10 whether the signals represent a character/graphic area or a photographic area, and the discriminated result represented by an SEN signal is notified to the smoothing circuit 3-04.

Next, in the smoothing circuit 3-04, a smoothing process is performed only to the character/graphic area on the basis of the image area separation result (SEN signal) sent from the image area separation unit 3-07. More specifically, in the smoothing circuit 3-04, a changeover of 400 dpi/800 dpi lines is performed for each pixel in accordance with the image area separation result (represented by the SEN signal) sent from the image area separation unit 3-07, data having twice resolution for the input image is generated, and the obtained data is output to a gamma conversion table 3-05.

Then, in the gamma conversion table 3-05, density data of the respective resolutions is data-converted in accordance with gradation reproducibility of a printer unit 3-06.

The Y, M, C and K image signals processed as above and the SEN signal being the changeover signal of 400 dpi/800 dpi lines are sent to a laser driver provided in the printer unit 3-06, whereby recording based on these signals is performed according to a PWM (pulse width modulation) manner in the printer unit 3-06.

By the structure explained as above, in the conventional image processing system, a satisfactory image according to a kind of image can be obtained.

However, in the conventional image processing system, it is possible to change the process by sending an attribute signal to the smoothing circuit 3-04, according to which of character, graphic and photograph the attribute of each object indicates. However, the image area can not be completely separated by the image area separation unit 3-07. That is, in some cases, image quality rather occasionally decreases due to misjudgment concerning the image area.

However, since the print data (assumed to be PDL (page description language) data in this case) to be processed by the image processing apparatus includes the description for representing the attribute (which of character, graphic and photograph) of each object, it is possible to generate the attribute signal to each object and then send it to the above smoothing circuit, whereby the problem of misjudgment as above can be solved.

However, when the data of each pixel of each of Y, M, C and K is eight-bit data, if the attribute signal is added to the data of each pixel as above, the obtained data is necessarily processed as nine-bit data, whereby various new problems occur. More specifically, more memories are needed because a data amount increases by one bit for each data, and an increase of image data capacity influences a transfer speed of the image data.

SUMMARY OF THE INVENTION

An object of the present invention is to provide an image processing apparatus which eliminated such an inconvenience as above, and a control method of the image processing apparatus.

Another object of the present invention is to provide an image processing apparatus which can print a satisfactory image output according to a kind of image without pressure of memory resources and a decrease of transfer speed due to an increase of image data capacity, by expanding print data received from an external apparatus into image data, generating an attribute signal representing an attribute of the image data expanded based on the print data, storing the image data of which the data capacity has been reduced by decreasing the number of gradations and the generated attribute signal in a frame memory, and transmitting the image data stored in the frame memory to an image forming apparatus capable of forming an image according to the attribute of the image data in a state that the attribute signal has been added to the stored image data, and a control method of the image processing apparatus.

The above and other objects of the present invention will become apparent from the following detailed description based on the attached drawings.

BRIEF DESCRIPTION OF THE DRAWINGS

FIGS. 11A, 11B and 11C are schematic views respectively showing a hold status with a state of image data (frame memory) in each mode of a resolution priority mode and a gradation priority mode and a status when the image data is transmitted to the image forming apparatus;

FIG. 13 is a schematic view for explaining a memory map of a storage medium for storing various data processing programs.

DETAILED DESCRIPTION OF THE PREFERRED EMBODIMENTS

Hereinafter, embodiments of the present invention will be explained with reference to the attached drawings.

Figure 1:
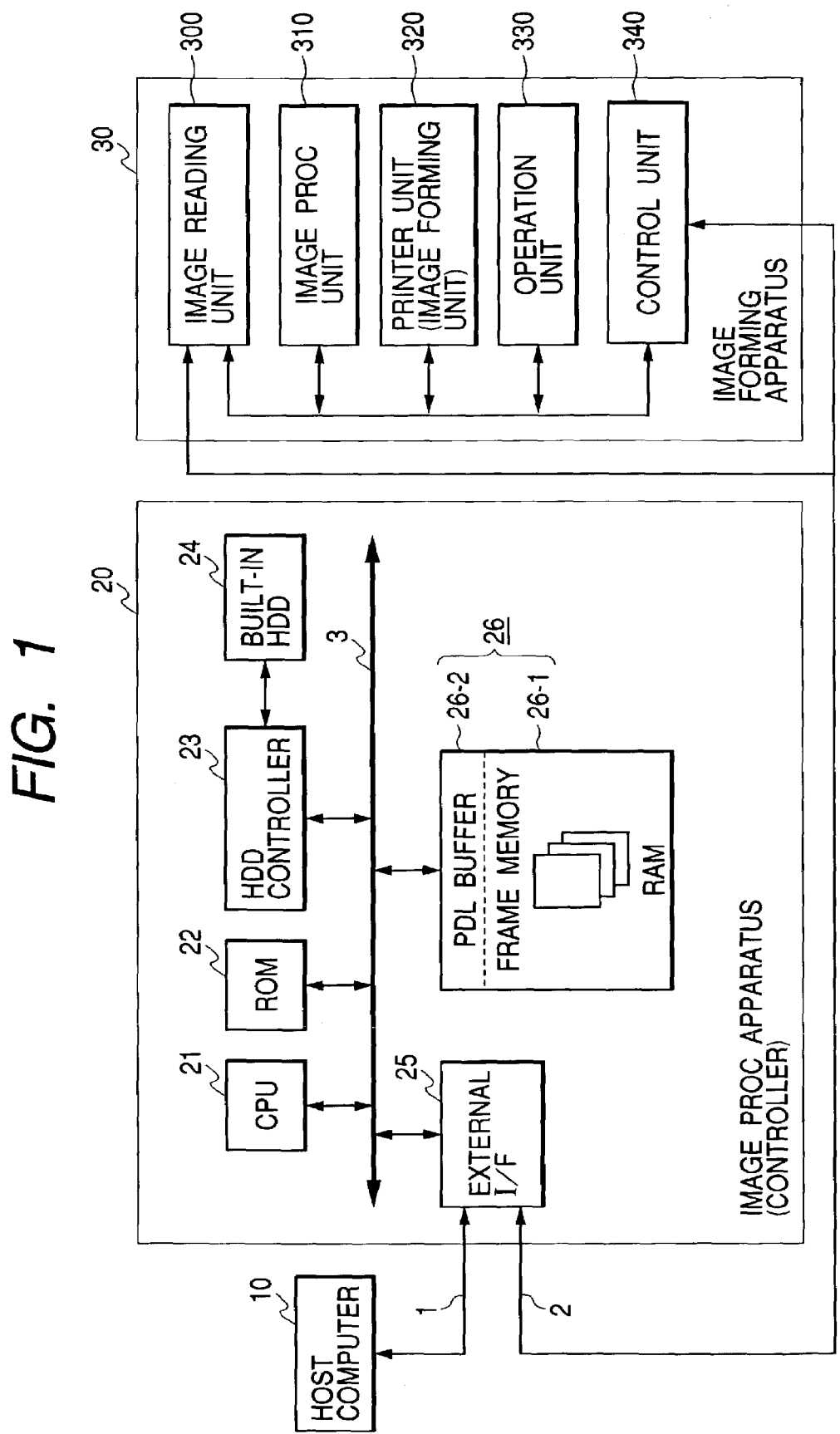
FIG. 1 is a block diagram showing electrical structure of an image processing system to which the present invention is applied.

FIG. 1 is a block diagram schematically showing electrical structure of an image processing system indicating an embodiment of the present invention.

The image processing system has a host computer 10, an image processing apparatus (controller) 20 and an image forming apparatus 30 which are mutually connected through a cable 1 and a cable 2.

The host computer 10 functions as a supplying source of print data (assumed to be PDL data in this case). The controller 20 once stores the print data supplied from the host computer 10 through the cable 1 and an external interface (I/F) 25 into a built-in HDD (hard disk drive) 24 through an HDD controller 23. The print data held in the built-in HDD 24 is temporarily held in a PDL buffer 26-2 through a CPU bus 3. The controller 20 expands the PDL data held in the PDL buffer 26-2 into a frame memory 26-1 to generate image data.

The image data expanded into the frame memory 26-1 is transferred to the image forming apparatus 30 through the cable 2 and is printed on a recording medium. The cables 1 and 2 may be general-purpose cables such as a parallel cable, an SCSI (Small Computer System Interface) cable, a serial cable, a network cable or the like, or an exclusive cable.

The image forming apparatus 30 functions as a printer for outputting the print data generated by the host computer 10 and also functions as a copying machine or a scanner for copying an original.

The controller 20 obtains status information of the image forming apparatus 30 through a cable 3 and can transmit that information to the host computer 10 and further can control the image forming apparatus 30 on the basis of the status information.

In the controller 20, a CPU 21 operates based on a control program stored in a ROM 22, the built-in HDD 24 or another storage medium (floppy (registered trademark) disk, CD-ROM or the like) which is not shown and controls the function of the image processing apparatus 20.

The built-in HDD 24 has an area for temporarily holding the printed PDL data or the image data generated by expanding the PDL data, or an area for storing font data and is connected to the CPU bus 3 through the HDD controller 23.

A RAM 26 includes the PDL buffer 26-2 being a buffer of temporarily holding the PDL data received from the host computer 10 and the frame memory 26-1 used for temporarily holding the developed image data after developing the PDL data.

It is available that the ROM 22 is structured by, for example, a programmable memory (for example, EEPROM), wherein a control program can be installed from the host computer 10 or the like, or it is available to be structured by, for example, a memory medium such as a floppy (registered trademark) disk, a CD-ROM or the like and a controller (driver) or the like for that memory medium.

It should be noted that a memory medium itself (for example, the ROM 22), which is in a state of storing the control program with a state that the control program can be read by the CPU 21, constitutes the present invention.

The controller 20 generates image data for full colors or gray scale in accordance with the PDL data supplied from the host computer 10. A transmission of the image data to the image forming apparatus 30 is performed through the cable 2.

The image forming apparatus 30 generates C, M, Y and K data (in case of gray scale, K data) in an image processing unit 310 on the basis of the image data supplied from the controller 20 and supplies the generated data to an image forming unit 320 to output image data on a recording medium. The image data read by an image reading unit 300 is supplied to the image forming unit 320 to output the image data on the recording medium.

The image forming unit 320 has a function of outputting a color image or a gray scale image having, for example, the resolution of 400 dpi or 800 dpi.

A control unit 340 controls an operation of the image forming apparatus 30 on the basis of a command from the controller 20 or an operation unit 330.

Figure 2:
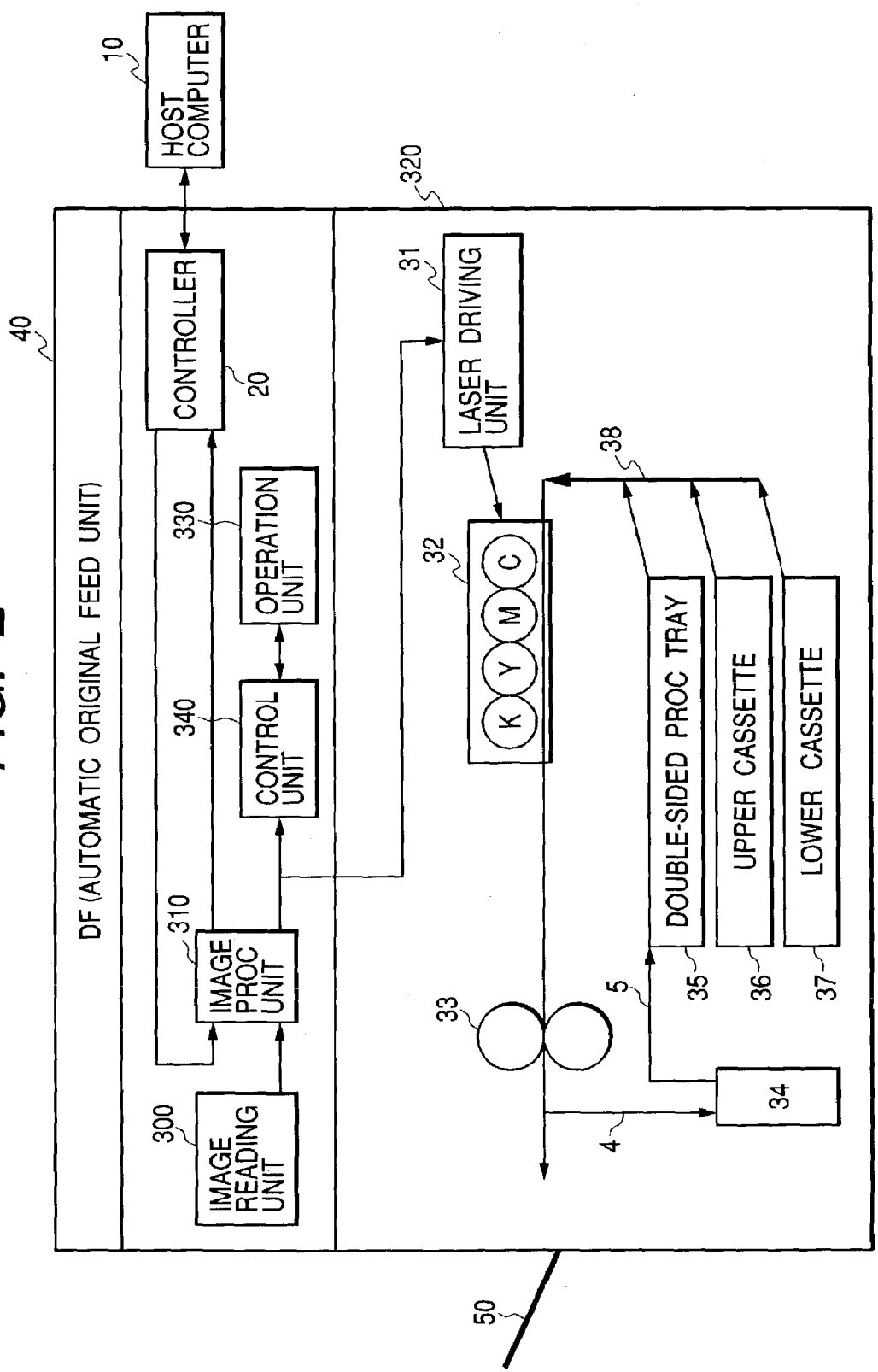
FIG. 2 is a view showing structure of an image forming apparatus shown in FIG. 1.

FIG. 2 is a structural view showing an example of the concrete structure of the image forming apparatus 30 shown in FIG. 1. In FIG. 2, the same reference numerals are given to the same portions as those in FIG. 1. This structural example indicates the image forming apparatus of an electrophotographic system which can output a full color image and has functions as a copying machine and a printer.

In FIG. 2, an automatic original feed apparatus (DF (Document Feeder)) 40 sequentially carries plural originals stacked on a predetermined position to an original reading position (not shown) one by one. The original put on the original reading position (not shown) by the DF 40 or a manual operation is read by the image reading unit 300 which includes, for example, an optical system, a color CCD or the like. Then, R, G and B data corresponding to an original image are generated and transmitted to the image processing unit 310.

The image processing unit 310 selects either the image data transmitted from the controller 20 or the image data transmitted from the image reading unit 300 on the basis of a control by the control unit 340 and transmits the selected image data to the image forming unit 320 and the controller 20. That is, the control unit 340 selects the image data supplied from the controller 20 in a case where the image forming apparatus 30 is used as the printer and selects the image data supplied from the image reading unit 300 in a case where the image forming apparatus 30 is used as the copying machine.

The image processing unit 310 converts input R, G and B data into Y, M, C and K data and supplies the image data of each of C (Cyan), M (Magenta), Y (Yellow) and K (Black) to a laser driving unit 31 of the image forming unit 320.

The laser driving 31 converts the supplied C, M, Y and K image data into a laser beam, which is to be scanned on drums of a photosensitive drum unit 32 to form latent images. A recording sheet used for the output of an image is selectively fed from an upper cassette 36 or a lower cassette 37, and is carried to the photosensitive drum unit 32 via a carrying path 38.

The latent image on the photosensitive drum unit 32 is developed by a developing unit (not shown). Thereby, a visible image (toner image) is formed and that image is transferred onto the recording sheet. Operations of the formation, the development and the transference of the latent image are performed for each of C, M, Y and K, and a color image is synthesized on the recording sheet.

The recording sheet on which the toner image is transferred is carried to a fixing unit 33, where the toner image is fixed. Thereafter, the recording sheet is discharged to a sheet discharge tray 50 in a mode of forming the image on a single-sided face.

On the other hand, in a mode of forming the image on double-sided faces, the recording sheet is reversed in a reversing unit 34 via a carrying path 4 when the transference of the toner image onto the single-sided face of the recording sheet is terminated, then the recording sheet is carried to the carrying path 38 again via a carrying path 5 and a double-sided processing tray 35. Then, after transferring the toner image onto a back face of the recording sheet, the toner image is fixed by the fixing unit 33, and the recording sheet is discharged to the sheet discharge tray 50.

Figures 3, 4:
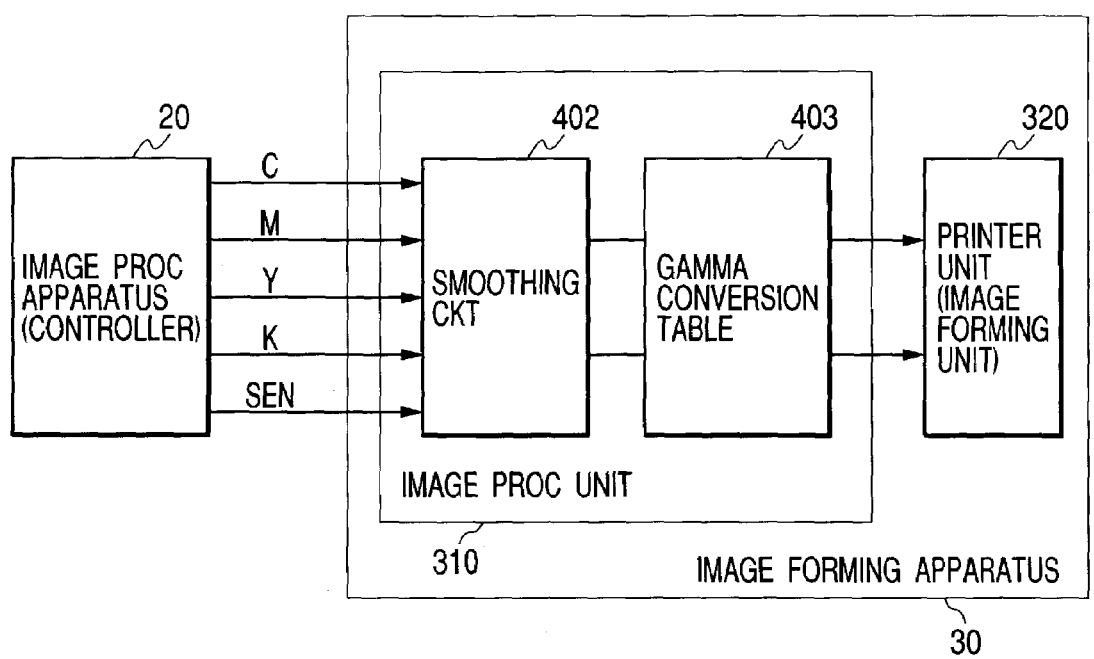
FIG. 3 is a block diagram showing image process structure in the image processing system shown in FIG. 1.
FIG. 4 is a view showing an attribute map corresponded to each pixel of an image.
Figure 14:
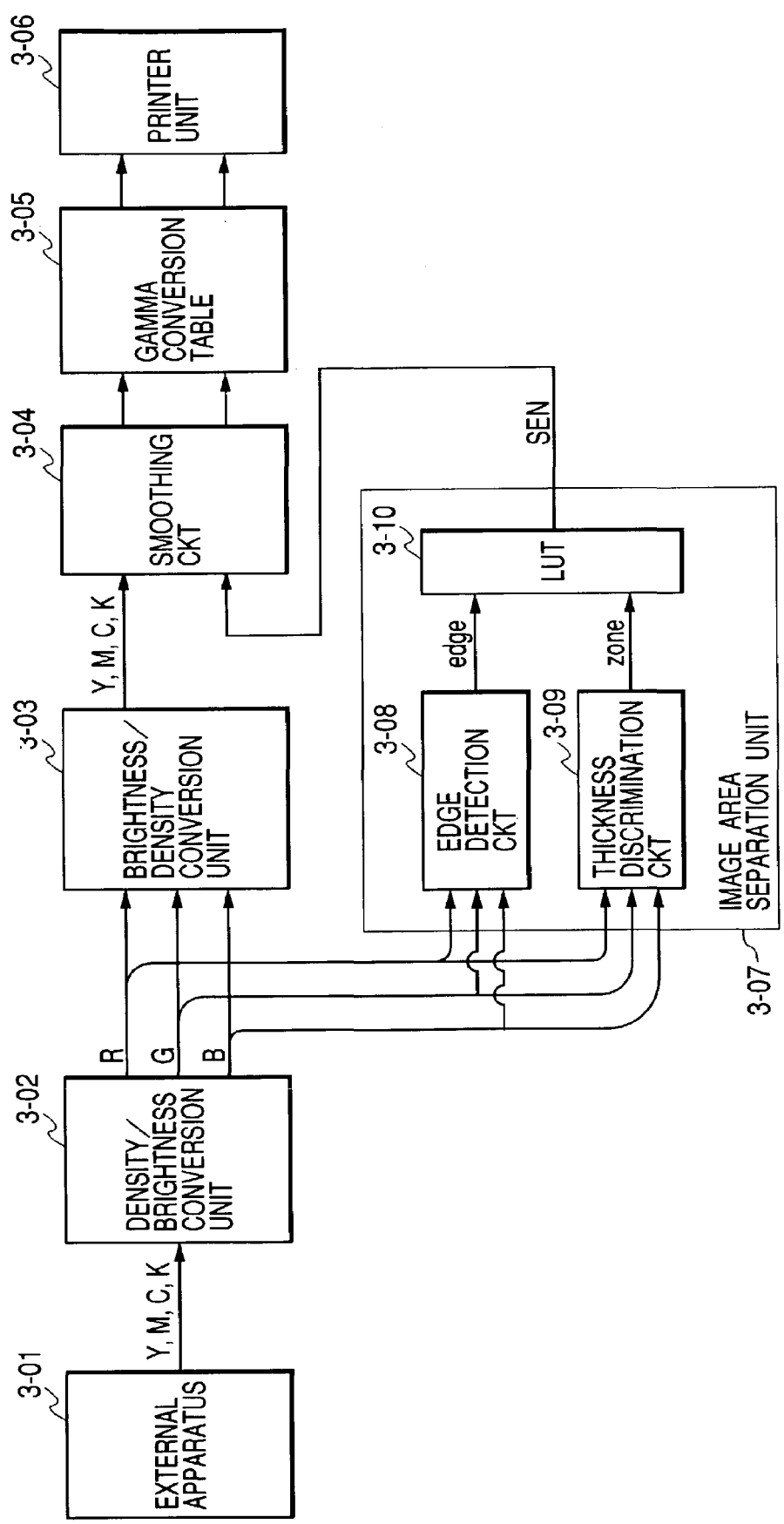
FIG. 14 is a block diagram showing structure of a conventional image processing system.

FIG. 3 is a block diagram showing the structure of performing a changeover of 400 dpi/800 dpi lines. In FIG. 3, the same reference numerals are given to the same portions as those in FIG. 1. In this example, the number of lines is changed by using an attribute signal at a side of the image processing apparatus (controller) 20 without using an SEN signal from an image area separation unit shown in FIG. 14.

The image processing apparatus (controller) 20 performs an image area separation (extracts each object) on the basis of an attribute (which of character, graphic and photograph) of each object described in the print data (assumed to be PDL data in this case) input from a host computer and can form an attribute signal (SEN signal) for each object.

As shown in FIG. 3, the image data (image signal) of each of Y, M, C and K and the attribute signal (SEN signal) are sent from the image processing apparatus (controller) 20 to be input to a smoothing circuit 402 in the image processing unit 310.

In the smoothing circuit 402, the changeover of the 400 dpi/800 dpi lines is performed for each pixel in accordance with the attribute signal (SEN signal). Then, in a gamma conversion table 403, a data conversion is performed to density data of each resolution in accordance with gradation reproduction of the printer unit (image forming unit) 320.

The Y, M, C and K image signals (image data) processed as above and the SEN signal (attribute signal) being a changeover signal of the 400 dpi/800 dpi lines are sent to the laser driver (laser driving unit 31) provided in the printer unit (image forming unit) 320, then a recording according to a PWM (pulse width modulation) manner is performed in the printer unit (image forming unit) 320.

Hereinafter, a concrete example of the attribute signal (SEN signal) will be explained as to an attribute map (a map in which the SEN signal shown in FIG. 3 is corresponded to each pixel as the attribute signal) to be generated by the image processing apparatus (controller) 20.

FIG. 4 is a schematic view showing an example of the attribute map corresponded to each pixel to be generated by the image processing apparatus (controller) 20.

In FIG. 4, a bit map is expressed. That is, an image, where a numeral "1" being an image of a character attribute is included in a background image being an image of a photographic attribute, is expressed. It should be noted that this attribute map is generated by the image processing apparatus 20 on the basis of description used for representing the attribute of each object (which of character, graphic and photograph) in the print data (assumed to be PDL data in this case).

It is assumed that the attribute map generated by the image processing apparatus (controller) 20 expresses a character pixel by "1" and a photographic pixel by "0", an attribute map of two-dimensional disposition by "0" and "1" shown in FIG. 4 is completed. Of course, the photographic pixel may be expressed by "1" and the character pixel may be expressed by "0". In this case, an attribute map, where the position of the shown "0" and "1" is reversed, is obtained.

Figure 5:
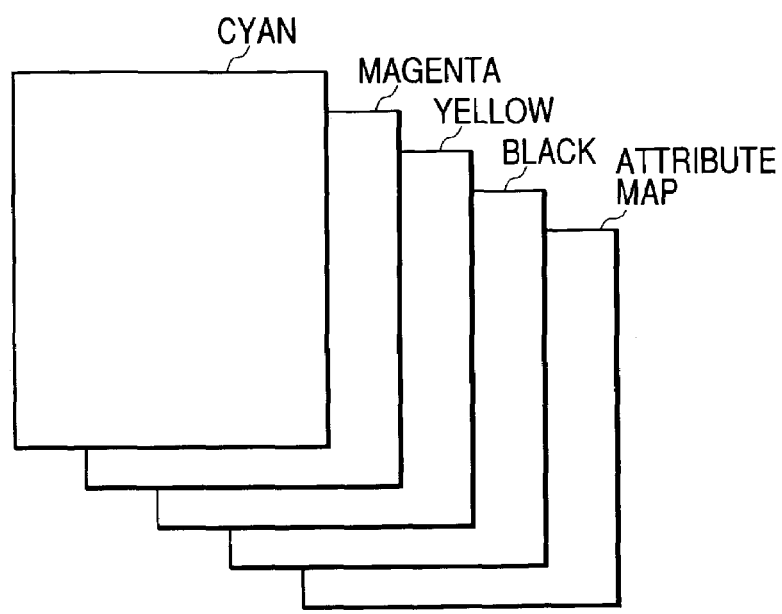
FIG. 5 is a schematic view showing an example of a format when image data and an attribute signal are held.

In the image processing apparatus (controller) 20, the attribute map generated by the CPU 21 in the image processing apparatus (controller) 20 is stored in the frame memory 26-1 together with the raster expanded image data. However, the attribute map may be arbitrarily structured if it is stored with a state of corresponded to each pixel. For example, as a plane of the attribute map shown in FIG. 4, it may be structured that the image data and the attribute map are separately memorized. In this case, five planes obtained by adding a plane of the attribute map to each plane of the C, M, Y and K is held as an image of one page as shown in FIG. 5 (Planner).

Figure 6:
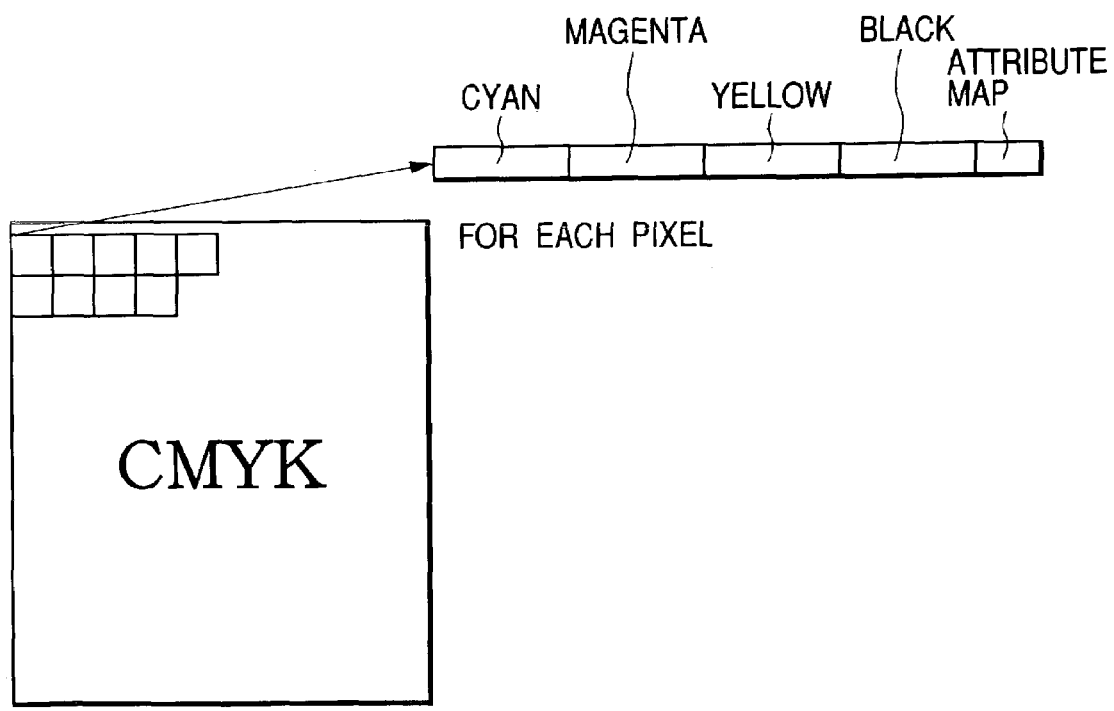
FIG. 6 is a schematic view showing another example of the format when the image data and the attribute signal are held.

Further, as shown in FIG. 6, in a case where the C, M, Y and K data are structured within one pixel, attribute information may be buried in information of the C, M, Y and K data of each pixel with a pattern of adding the attribute information (Chunky). In order to structure not to increase data amount, a format of the attribute map can be determined in accordance with necessity in such a manner. That is, it may be structured that the attribute map is buried in a lower bit of each pixel of any one plane or plural planes among respective planes of the C, M, Y and K data.

Hereinafter, the attribute signal (SEN signal) shown in FIG. 3 will be concretely explained with reference to FIGS. 7 to 9.

Figure 7:
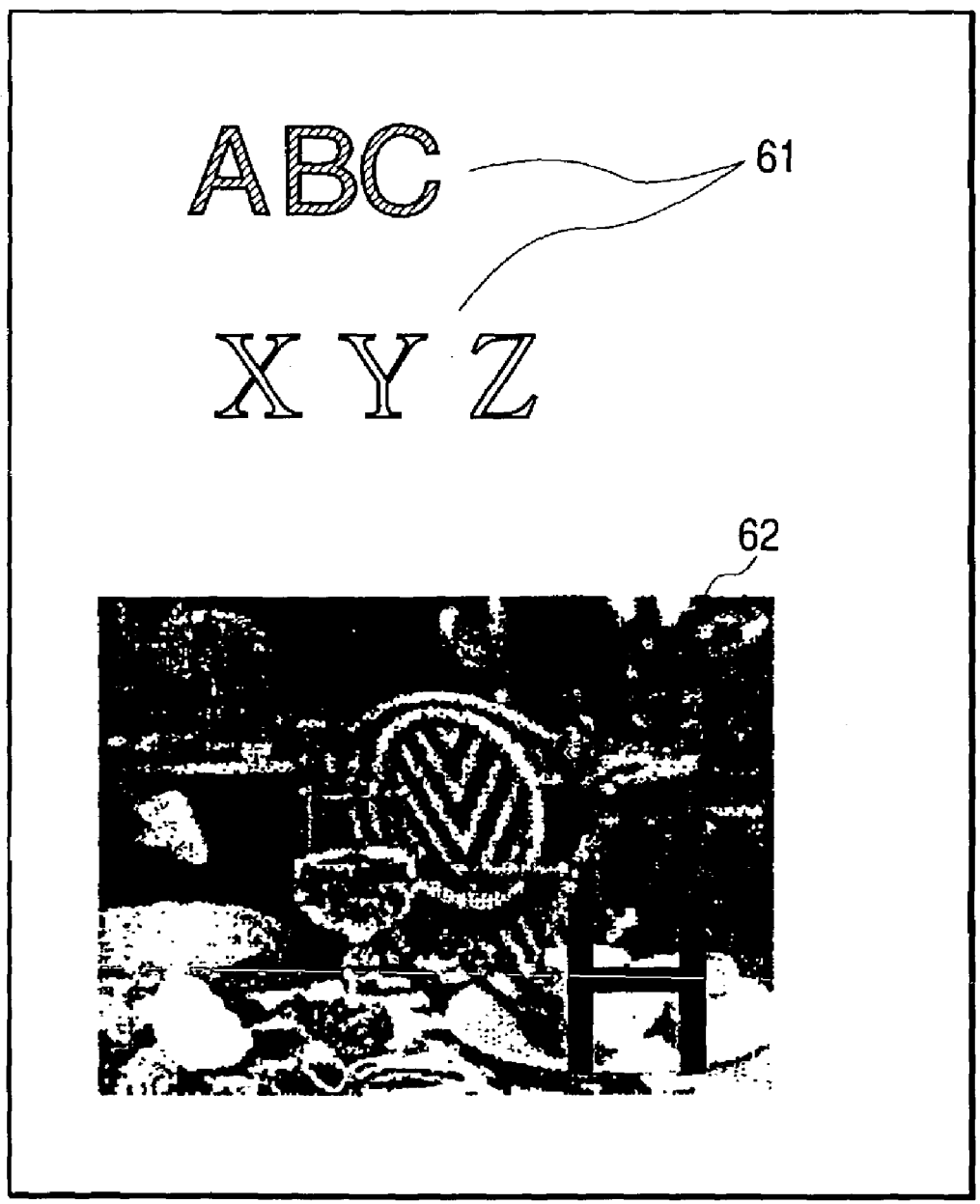
FIG. 7 is a schematic view showing an example of print image data.

FIG. 7 is a schematic view showing print data created on application software by the host computer 10 or the like.

In FIG. 7, numeral 61 denotes characters written as "ABC" and "XYZ", and numeral 62 denotes an object being a photograph. As shown in FIG. 7, an original has a character of "H" which is buried in an area of the photograph 62.

Figure 8:
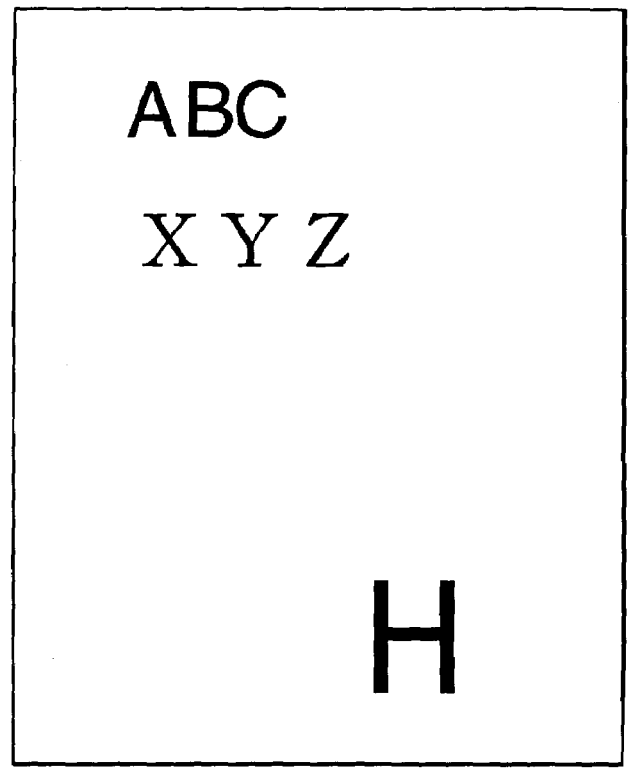
FIG. 8 is a schematic view showing an example of a generated attribute map.
Figure 9:
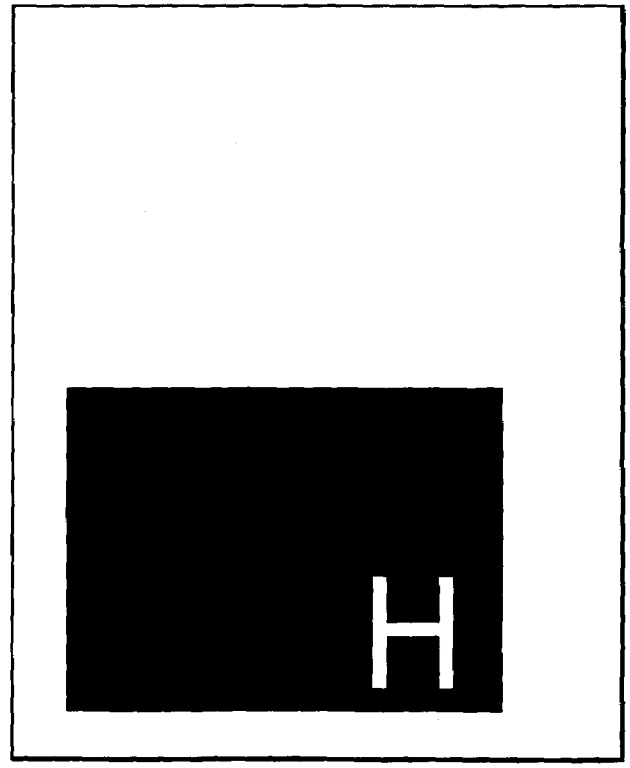
FIG. 9 is a schematic view showing an example of the generated attribute map.

FIGS. 8 and 9 are schematic views respectively showing an example of the attribute map generated by the image processing apparatus (controller) 20, and the attribute maps are corresponded to the print data shown in FIG. 7.

First, in FIG. 8, portions drawn by the black correspond to a portion indicated by "1" in the attribute map, and a portion drawn by the white corresponds to a portion indicated by "0" in the attribute map. In the example of FIG. 8, as a result, portions of "1" were judged as character pixels. That is, the attribute map is generated by treating the character pixel as "1". In FIG. 8, pixels of the background are indicated by "0" together with an area of photographic pixels, and only the portion where the character is drawn is extracted.

In FIG. 9, as well as FIG. 8, a portion drawn by the black corresponds to a portion indicated by "1" in the attribute map, and a portion drawn by the white corresponds to a portion indicated by "0" in the attribute map. In the example of FIG. 9, as a result, portions of "1" were judged as photographic pixels. That is, the attribute map is generated by treating the photographic pixel as "1". In FIG. 9, the background, that is, a background portion on the original is indicated by "0" together with the character pixel, and only the portion where the photographic image is drawn is extracted.

In this manner, according to an image area separation method (attribute map generating method) by the image processing apparatus (controller) 20, only the character pixel can be extracted as shown in FIG. 8, or inversely, only the photographic pixel can be extracted as shown in FIG. 9.

Figure 10A:
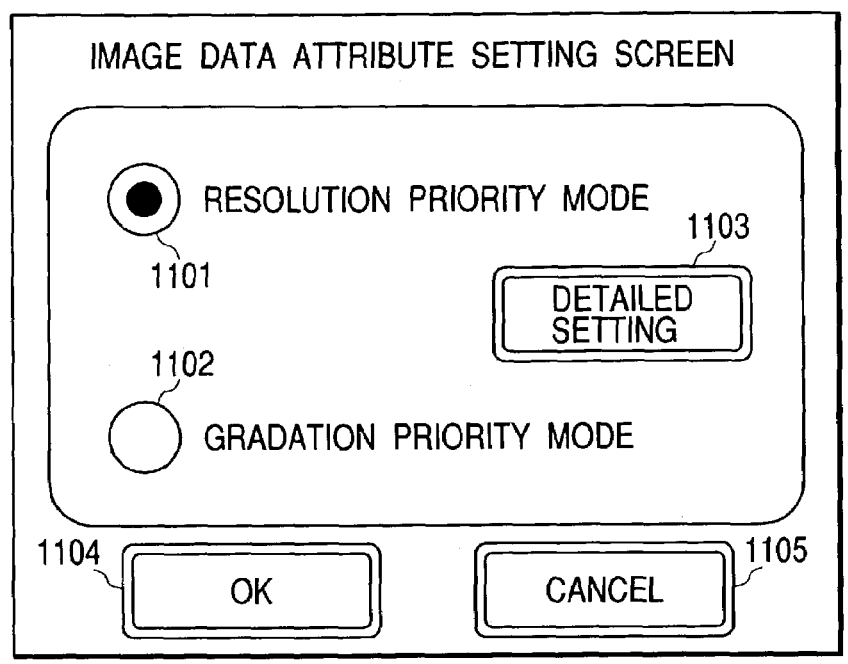
FIGS. 10A and 10B are schematic views respectively showing an example of a screen used for setting an attribute of the image (image output mode) when the image is printed.
Figure 10B:
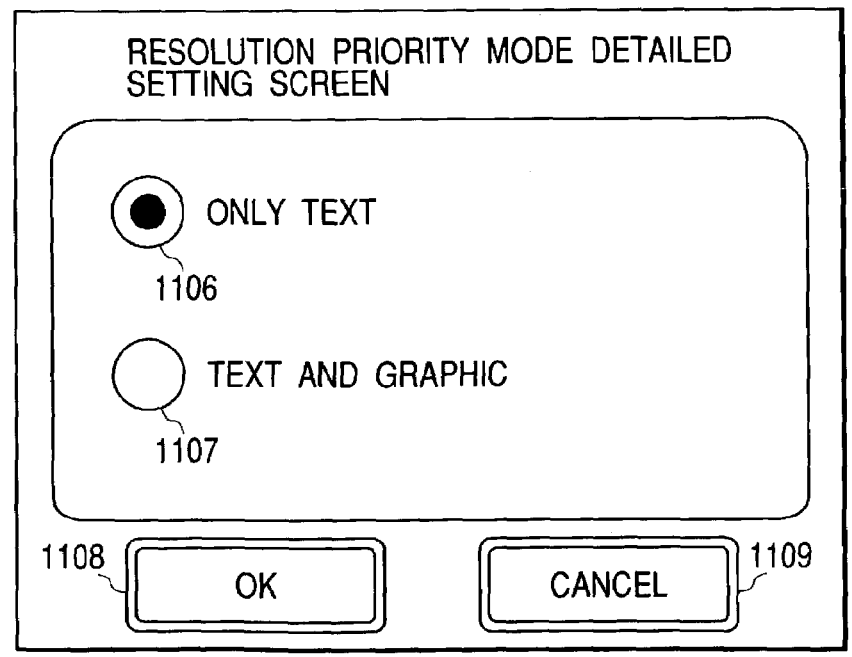

FIGS. 10A and 10B are schematic views respectively showing an example of a screen used for setting the attribute (image output mode) of the image data when the image is printed and is displayed on a display unit (not shown) of the host computer 10.

FIG. 10A is an example of an image data attribute (image output mode) setting screen for selecting a gradation priority mode and a resolution priority mode as the image output mode.

In the image data attribute (image output mode) setting screen in FIG. 10A, numeral 1101 denotes a resolution priority mode button, and numeral 1102 denotes a gradation priority mode button. A user can selectively set the resolution priority mode or the gradation priority mode as to the image output mode for the image data by depressing either the resolution priority mode button 1101 or the gradation priority mode button 1102.

Numeral 1104 denotes an OK button. Image data attribute setting is made available by depressing this OK button, and a print process can be started. Numeral 1105 denotes a cancel button. The image data attribute setting can be made unavailable by depressing this cancel button.

Numeral 1103 denotes a detailed setting button. In a case where the resolution priority mode is set by the resolution priority mode button 1101, when the detailed setting button 1103 is further depressed, a resolution priority mode detailed setting screen shown in FIG. 10B is displayed.

In the resolution priority mode detailed setting screen shown in FIG. 10B, numeral 1106 denotes an only text button and numeral 1107 denotes a text and graphic button. A user can selectively set if the attribute is set for only a text portion or the attribute is set for text and graphic portions in the resolution priority mode by depressing either the only text button 1106 or the text and graphic button 1107.

Numeral 1108 denotes an OK button. The resolution priority mode detailed setting is made available by depressing this OK button then it is returned to the image data attribute setting screen shown in FIG. 10A. Numeral 1109 denotes a cancel button. The resolution priority mode detailed setting is made unavailable by depressing this cancel button then it is returned to the image data attribute setting screen shown in FIG. 10A.

FIGS. 11A, 11B and 11C are schematic views for respectively showing a status (holding status in the frame memory 26-1 and status when the image data is transmitted to the image forming apparatus 30) of the image data in each of the resolution priority mode and the gradation priority mode set by the image data attribute (image output mode) setting screen. As shown in FIG. 6, a case that the attribute information is buried in the C, M, Y and K data of each pixel and is held in the frame memory 26-1 will be explained as an example.

FIG. 11A shows an example of the image data in case of setting the image data attribute to the resolution priority mode and shows data for one pixel. In this example, data of each of C (Cyan), M (Magenta), Y (Yellow) and K (Black) is not set as eight-bit (256-gradation) data but set as seven-bit (128-gradation) data, to which respective one-bit attribute data is added.

FIG. 11B shows another example of the image data in case of setting the image data attribute to the resolution priority mode, and data of any one color among the C, M, Y and K is set as seven-bit data, to which the one-bit attribute data is added. In this example, the data of black is set as seven-bit data. However, it may be constituted as follows. That is, the user can arbitrarily set that what color data among the C, M, Y and K data is to be set as seven-bit data, or any one color data (for example, one color of which the gradation width is most reduced) among the C, M, Y and K data is to be automatically set as seven-bit data from the image data.

FIG. 11C shows an example of the image data in case of setting the image data attribute to the gradation priority mode. As shown in FIG. 11C, in a case of the gradation priority mode, each color data of the C, M, Y and K is held as eight-bit (256-gradation) data and the attribute data is not added.

The above-indicated image data is held in the frame memory 26-1 and is sequentially transmitted to the image forming apparatus 30 to perform an image formation.

In case of reducing capacity of the image data when the attribute data is added, a case of reducing the eight-bit data to the seven-bit data is shown in the present embodiment. However, the capacity of the image data may be reduced by compressing the image data. In case of performing compression, it may be structured that only the image data is compressed and held in the frame buffer 26-1, and when the image data is transmitted to the image forming apparatus 30, the compressed image data is decompressed and the attribute data is added to the decompressed data, then thus obtained data is transmitted. Further, it may be structured that the image data is compressed with a form of including the attribute data and is held in the frame buffer 26-1, then this data is decompressed when the image data is transmitted to the image forming apparatus 30.

Hereinafter, each processing flow for respective case of setting to the resolution priority mode and the gradation priority mode when the image data created on the host computer 10 is printed will be explained with reference to a flowchart shown in FIG. 12.

Figure 12:
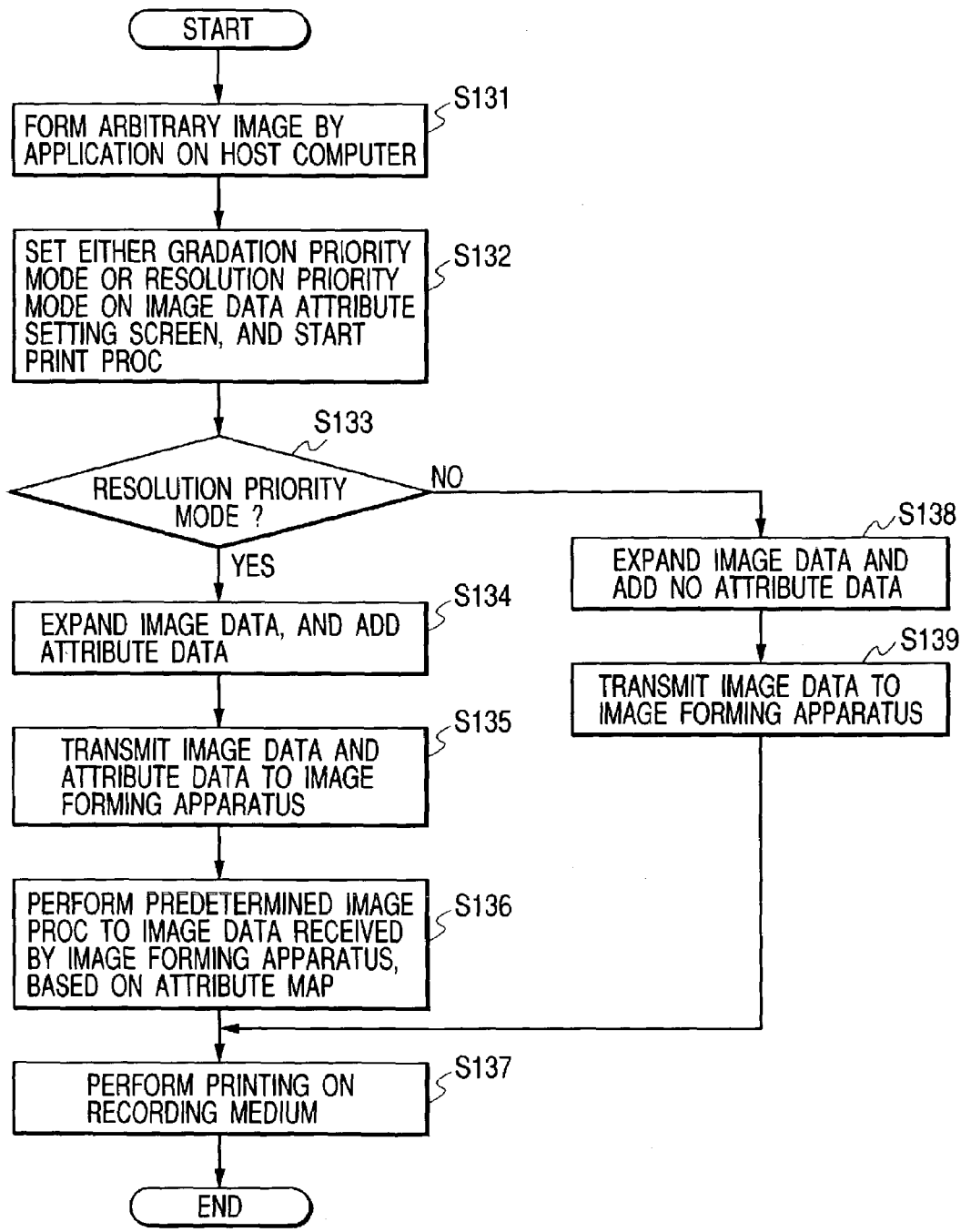
FIG. 12 is a flowchart showing an image processing procedure.

FIG. 12 is a flowchart showing an example of a first image processing procedure in the image processing system to which an information processing apparatus, the image processing apparatus and the image forming apparatus of the present invention can be applied, and the flowchart corresponds to each processing procedure of the case that the mode is set to the resolution priority mode and the gradation priority mode when the image data created on the host computer 10 is printed. It should be noted that reference symbols S131 to S139 respectively indicates each of steps. The step S131 is performed by a CPU (not shown) in the host computer 10 on the basis of programs stored in a ROM or another storage medium, the steps S132 to S135, S138 and S139 are performed by the CPU 21 in the image processing apparatus (controller) 20 shown in FIG. 1 on the basis of programs stored in the ROM 22, the built-in HDD 24 or another storage medium, and the steps S136 and S137 are performed by the CPU (not shown) in the host computer 10 on the basis of programs stored in the ROM or another storage medium.

First, an arbitrary image is formed by application software on the host computer 10 (S131), and either the resolution priority mode or the gradation priority mode is set on the image data attribute (image output mode) setting screen, then a printing process is started by depressing the OK button 1104 (S132). That is, the host computer 10 transmits the print data (assumed to be PDL data in this case) and information of indicating the image data attribute (image output mode) set in the print data to the image processing apparatus (controller) 20.

The image processing apparatus 20 which received the print data and the information of indicating the image data attribute (image output mode) set in the print data from the host computer 10 judges if the image output mode of the print data is set to which of the resolution priority mode or the gradation priority mode (S133). If it is set to the resolution priority mode, in the step S134, the image processing apparatus 20 expands the print data into image data (raster data) and generates the attribute data on the basis of description for representing the attribute (which of character, graphic and photograph) of each object in the print data. Then, the expanded image data and the generated attribute data are stored in the frame buffer 26-1. At this time, as shown in FIGS. 11A and 11B the number of gradations of the image data is decreased, or a reduction process is executed to the image data by the known compression process or the like so as to reduce the capacity of the image data. The reduction process may be executed when the image data is expanded or when the image data is stored after performing the expansion. Further, in case of adding the attribute data to the image data, the image data to which the attribute data was added may be stored, or the image data is stored without adding the attribute data and the attribute data may be added to the image data when the image data is read.

Next, the image processing apparatus 20 transmits the image data and the attribute data to be stored in the frame buffer 26-1 to the image forming apparatus 30 (S135). The image forming apparatus 30, which received the image data and the attribute data, performs a predetermined image processing to the image dada on the basis of the attribute map (S136). Then, an image based on the image data, to which the above image processing was performed, is printed on the recording medium (S137).

On the other hand, in a case where the image processing apparatus 20 judged that the image output mode of the print data input from the host computer 10 is set to the gradation priority mode in the step S133, the image processing apparatus 20 expands the print data into the image data (raster data) to store it in the frame buffer 26-1 (S138). At this time, the attribute data is not generated and not added. Further, the reduction process of decreasing the capacity of the image data has not to be executed.

Next, the image processing apparatus 20 transmits only the image data stored in the frame buffer 26-1 to the image forming apparatus 30 (S139). The image forming apparatus 30, which received the image data, prints an image based on the received image data on the recording medium (S137).

By the above processes, in case of printing the image data, either the resolution priority mode or the gradation priority mode is set on the host computer 10. In a case of the resolution priority mode, the attribute data of the image data is added to the image data in the image processing apparatus (controller) 20 and thus obtained data is transmitted to the image forming apparatus 30 to perform a print output on the recording medium, thereby enabling the image forming apparatus to print the optimum image adjusting to kinds of image.

Incidentally, in the present embodiment, the structure that the image data attribute (resolution priority mode or gradation priority mode) is set in the print data on the host computer 10 when the printing is performed is explained. However, it may be structured that the image data attribute (resolution priority mode or gradation priority mode) is previously set in the image processing apparatus (controller) 20 from the host computer 10 or the operation unit 330 of the image forming apparatus 30 and is stored in the built-in HDD 24, the RAM 26 or the like, and all the print data transmitted from the host computer 10 is processed with this image data attribute until the above setting is changed.

Moreover, in the present embodiment, a case that the image output mode of the image data expanded from the print data is set to the resolution priority mode or the gradation priority mode in the image data attribute (image output mode) setting screen shown in FIG. 10A is explained. However, it may be structured that the image processing apparatus (controller) 20 automatically sets the image output mode of the image data expanded from the print data on the basis of the print data received from the external apparatus. For example, it may be structured that the gradation priority mode is automatically set on the basis of the description for representing the attribute (which of character, graphic and photograph) of the each object in the print data (assumed to be PDL data in this case) in a case where a ratio of the image data including a "photograph" attribute exceeds a predetermined threshold value, while the resolution priority mode is automatically set excepting the above case.

Moreover, in the present embodiment, a case that a system of the image forming apparatus 30 is a laser beam system is explained as an example. However, the present invention can be applied to a case of an electrophotographic system (e.g., LED system), a liquid crystal shutter system, an inkjet system, a thermal transfer system, a sublimation system or another printing system other than the laser beam system.

As described above, in case of outputting the image data putting priority to the gradation (case of setting the image output mode to the gradation priority mode) in accordance with kinds of image data, the image data is formed as the eight-bit data (256-gradation) without adding the attribute signal. In case of putting priority to the resolution (case of setting the image output mode to the resolution priority mode), the image data is formed as the eight-bit data by adding the attribute signal to the seven-bit data (128-gradation) and is transmitted to the image forming apparatus, by which an image formation in accordance with the attribute signal is performed, thereby enabling the image forming apparatus to print the optimum image adjusting to kinds of image with the image output mode desired by the user without occurring pressure of memory resources and a decrease of transfer speed due to an increase of capacity of the image data.

Hereinafter, the structure of a data processing program which can be read by the image processing system, to which the information processing apparatus, the image processing apparatus and the image forming apparatus according to the present invention can be applied, will be explained with reference to a memory map shown in FIG. 13.

FIG. 13 is a schematic view for explaining the memory map of a storage medium which stores various data processing programs which can be read by the image processing system, to which the information processing apparatus, the image processing apparatus and the image forming apparatus according to the present invention can be applied.

Although it is not particularly shown in the drawing, there sometimes is a case that information for managing program groups to be stored in the storage medium such as version information, information of a creator and the like are also stored, and information depending on an OS or the like at a program reading side such as icons and the like for discriminatingly displaying the program are also stored.

Further, data which is dependent on various programs is managed by the above directory. In a case where a program or data to be installed is compressed, a program to be decompressed or the like is also sometimes stored.

The function shown in FIG. 12 of the present embodiment may be performed by the host computer according to a program to be installed from an external. In this case, even in a case where information groups including programs are supplied to an output apparatus by a storage medium such as a CD-ROM, a flash memory, an FD or the like, or from an external storage medium through a network, the present invention can be adopted.

As above, it is needless to say that the object of the present invention can be achieved in a case where a storage medium recording the program codes of software for realizing the functions of the above-mentioned embodiments is supplied to a system or an apparatus and then a computer (or CPU or MPU) in the system or the apparatus reads and executes the program codes stored in the storage medium.

In this case, the program codes themselves read from the storage medium realize the new functions of the present invention, and the storage medium storing such the program codes constitute the present invention.

The storage medium for supplying the program codes can be, for example, a floppy (registered trademark) disk, a hard disk, an optical disk, a magnetooptical disk, a CD-ROM, a CD-R, a DVD-ROM, a magnetic tape, a non-volatile memory card, a ROM, an EEPROM, a silicon disk or the like.

It is needless to say that the present invention also includes not only a case where the functions of the above-mentioned embodiments are realized by the execution of the program codes read by the computer, but also a case where an OS (operating system) or the like functioning on the computer executes all the process or a part thereof according to the instructions of the program codes, thereby realizing the functions of the above-mentioned embodiments.

Moreover, it is needless to say that the present invention includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above-mentioned embodiments.

The present invention is applicable to a system composed of plural components or to an apparatus including single equipment. Further, it is needless to say that the present invention can be adapted to a case where the object is achieved by supplying the programs to the system or the apparatus. In this case, the system or the apparatus can accept an effect of the present invention by reading the storage medium storing the programs expressed by the software for achieving the present invention on the system or the apparatus.

Still further, the system or the apparatus can accept the effect of the present invention by downloading the programs expressed by the software for achieving the present invention from a database on a network by the communication program and reading the programs.

What is claimed is:

1. An image processing apparatus which expands print data received from an external apparatus into image data, and transmits the image data to an image forming apparatus capable of performing image formation according to an attribute of the image data, comprising:
   an expansion unit arranged to expand the print data received from the external apparatus into the image data;
   a generation unit arranged to generate an attribute signal representing the attribute of the image data created by said expansion unit on the basis of the print data;
   a data capacity reduction unit arranged to reduce a capacity of the image data created by said expansion unit;
   a data storage unit arranged to store the image data of which the data capacity has been reduced by said data capacity reduction unit and the attribute signal generated by said generation unit; and
   a transmission unit arranged to transmit the image data stored in said data storage unit to the image forming apparatus in a state that the attribute signal has been added to the image data.

2. An image processing apparatus according to claim 1, further comprising:
   a setting unit arranged to set an image output mode of the image data created by said expansion unit; and
   a control unit arranged to control whether or not to generate the attribute signal and add the generated attribute signal to the image data, on the basis of the image output mode set by said setting unit,
   wherein said data capacity reduction unit reduces the capacity of the image data in a case where it is controlled by said control unit to add the attribute signal to the image data.

3. An image processing apparatus according to claim 1, wherein said data capacity reduction unit reduces the capacity of the image data by compressing the image data.

4. An image processing apparatus according to claim 1, wherein said data capacity reduction unit reduces the capacity of the image data by compressing the image data in the state that the attribute signal has been added.

5. An image processing apparatus according to claim 1, wherein said data capacity reduction unit reduces the capacity of the image data by reducing the number of gradations of the image data.

6. An image processing apparatus according to claim 1, wherein, in a case in which the image data comprises plural color components, said data capacity reduction unit reduces the capacity of the image data by reducing only the number of gradations of the image data of any of the color components.

7. An image processing apparatus according to claim 2, wherein, in the case in which the print data is transmitted by the external apparatus, said setting unit sets the image output mode of the image data created from the print data received from the external apparatus.

8. An image processing apparatus according to claim 2, wherein said setting unit automatically sets the image output mode of the created image data, on the basis of the print data received from the external apparatus.

9. A control method of an image processing apparatus which expands print data received from an external apparatus into image data, and transmits the image data to an image forming apparatus capable of performing image formation according to an attribute of the image data, said method comprising:
- an expansion step of expanding the print data received from the external apparatus into the image data;
- a generation step of generating an attribute signal representing the attribute of the image data on the basis of the print data;
- a data capacity reduction step of reducing a capacity of the image data;
- a storage step of storing in a memory the image data of which the data capacity has been reduced and the generated attribute signal; and
- a transmission step of transmitting the image data stored in the memory to the image forming apparatus in a state that the attribute signal has been added to the image data.

10. A control method according to claim 9, further comprising:
- a setting step of setting an image output mode of the image data created in said expansion step; and
- a control step of controlling whether or not to generate the attribute signal and add the generated attribute signal to the image data, on the basis of the image output mode set in said setting step,
- wherein said data capacity reduction step includes reducing the capacity of the image data in a case in which it is controlled in said control step to add the attribute signal to the image data.

11. A control method according to claim 9, wherein said data capacity reduction step includes reducing the capacity of the image data by compressing the image data.

12. A control method according to claim 9, wherein said data capacity reduction step includes reducing the capacity of the image data by compressing the image data in the state that the attribute signal has been added.

13. A control method according to claim 9, wherein said data capacity reduction step includes reducing the capacity of the image data by reducing the number of gradations of the image data.

14. A control method according to claim 9, wherein, in a case in which the image data comprises plural color components, said data capacity reduction step includes reducing the capacity of the image data by reducing only the number of gradations of the image data of any of the color components.

15. A control method according to claim 10, wherein, in the case in which the print data is transmitted by the external apparatus, said setting step includes setting the image output mode of the image data created from the print data received from the external apparatus.

16. A control method according to claim 10, wherein said setting step includes automatically setting the image output mode of the created image data, on the basis of the print data received from the external apparatus.

17. A computer-readable storage medium which stores a program to cause an image processing apparatus for expanding print data received from an external apparatus into image data, and transmitting the image data to an image forming apparatus capable of performing image formation according to an attribute of the image data to execute following steps of said program:
- an expansion step of expanding the print data received from the external apparatus into the image data;
- a generation step of generating an attribute signal representing the attribute of the image data on the basis of the print data;
- a data capacity reduction step of reducing a capacity of the image data;
- a storage step of storing in a memory the image data of which the data capacity has been reduced and the generated attribute signal; and
- a transmission step of transmitting the image data stored in the memory to the image forming apparatus in a state that the attribute signal has been added to the image data.

* * * * *